United States Patent [19]

Dewey et al.

[11] 3,896,564

[45] July 29, 1975

[54] TRUCK DRIVER TRAINING APPARATUS

[75] Inventors: James W. Dewey, Broken Arrow; Alvin C. Eaton, Tulsa, both of Okla.

[73] Assignee: Atkins & Merrill, Incorporated, Tulsa, Okla.

[22] Filed: Dec. 3, 1973

[21] Appl. No.: 421,434

[52] U.S. Cl. ................................................. 35/11
[51] Int. Cl. .......................................... G09b 9/04
[58] Field of Search ........................................ 35/11

[56] References Cited
UNITED STATES PATENTS

| | | | |
|---|---|---|---|
| 1,723,744 | 8/1929 | McKenna | 35/11 |
| 3,071,874 | 1/1963 | Chedister | 35/11 |
| 3,154,864 | 11/1964 | Jazbutis | 35/11 |

Primary Examiner—Wm. H. Grieb

[57] ABSTRACT

This abstract describes an apparatus for use in the training of operators of trucks or other vehicles having manual transmissions. The essential component comprises a transimssion control simulator plus logic elements to generate appropriate signals corresponding to the simulated operation of the vehicle. It includes hydraulic means to assist the transmission shift lever to carry out a desired transmission gear connection when the proper operation conditions are met, and to refuse the transmission gear connection when the proper operating conditions are not met. The transmission has a first shaft journalled for rotation and translation in a frame. This carries a second shaft which is adapted to be traversed with the first shaft and to be selectively inserted into one of a plurality of openings corresponding to selected transmission speed connections. There are switches to indicate when the transmission connection is completed, that is, when the second shaft is inserted into an appropriate opening corresponding to a certain gear shift ratio. This switch information goes to logic boxes that compute the engine speed and the transmission characteristics. The hydraulic system which enables or restrains connections in a desired gear ratio, depends upon the output of a load cell connected between the first shaft and a hydraulic mechanism actuator, and also depends upon the input of a speed comparator, comparing the speed of rotation of the engine and the simulated ground speed of the vehicle.

13 Claims, 5 Drawing Figures

TRUCK DRIVER TRAINING APPARATUS

BACKGROUND OF THE INVENTION

This invention lies in the field of teaching machines. More particularly, it is concerned with the simulation of a multiple speed vehicle operating apparatus. Still more particularly it concerns the design of a vehicle transmission simulator so that a driver can be trained to operate the transmission in such a way as to successively shift up, or down in speed, under various operating conditions of the vehicle.

In the prior art there are numerous teaching machines involved with teaching drivers of vehicles. However, none of them, to the inventors' knowledge, have the features of this invention.

SUMMARY OF THE INVENTION

It is a primary object of this invention to provide a vehicle transmission simulation apparatus so that a student driver can operate the apparatus in such a way as to simulate the actual driving of that vehicle, having such a transmission apparatus. In particular, it is an object of this invention to provide a transmission simulator so that an operator handling the transmission lever will find it impossible to make a shift into a selected gear if the simulated speed conditions of the engine and of the vehicle do not properly correspond and to make it possible to enter the gear shift into a particular ratio when the proper speeds are obtained.

These and other objects are realized and the limitations of the prior art are overcome in this invention by using a simulated truck transmission which comprises a frame having a first shaft adapted to rotate and to translate in two axially aligned bearings in a frame. The first shaft carries an arm which is interlinked with the shift lever so that the first shaft can be translated and rotated by the shift lever. The arm also carries an actuator rod parallel to the first shaft, so that as the first shaft is translated and rotated through small angles on either side of a central position, the actuator rod is enabled to pass into one of a plurality of openings in the frame, and to close appropriate switches when starting to enter these openings, and when it is completely entered into the openings.

A force indicator, or load cell is connected between the first shaft and a hydraulic actuator. The hydraulic actuator is controlled by a servo amplifier which controls a hydraulic servo valve, so that the combined shaft, comprising the first shaft, the load cell and the actuator shaft translate as a unit in one direction or the other. In other words the first shaft can be controlled by the shift lever in cooperation with the hydraulic actuator. Whether the actuator follows and assists the movement of the first shaft set by the shift lever, depends upon a number of factors, but principally upon the question of whether the simulated speed of the engine is closely enough matched to the simulated speed of the vehicle. If these speeds are not closely matched the actuator opposes the movement of the first shaft into the opening corresponding to the desired gear.

An engine computer has inputs corresponding (a) to an engine speed-load characteristic and (b) to a throttle input in the form of an analog voltage. There is a clutch which comprises a switch, which when it is open disconnects the feedback from a transmission to the engine computer and the engine output to the transmission. The engine computer feeds an analog signal out to a load computer, which has two other inputs corresponding (a) to the mass loading of the vehicle and (b) to the grade of the road over which the vehicle is driving. The output of the load computer goes to a transmission gear ratio computer to provide the gound speed. If these two speeds, both in the form of small analog voltage, are within a selected small percentage of each other, then the actuator rod to be inserted completely into one or the other of the plurality of openings, the selected opening being dependent upon the particular gear ratio selected.

If these voltages are not within a narrow small range, then the servo amplifier inverts the relationship to the hydraulic actuator and the actuator then prevents the entry of the actuator rod into the selected opening, which indicates to the driver student that his gears are not properly meshing. He must change the relative speeds appropriately so that one gear will mesh properly with the other.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 1:
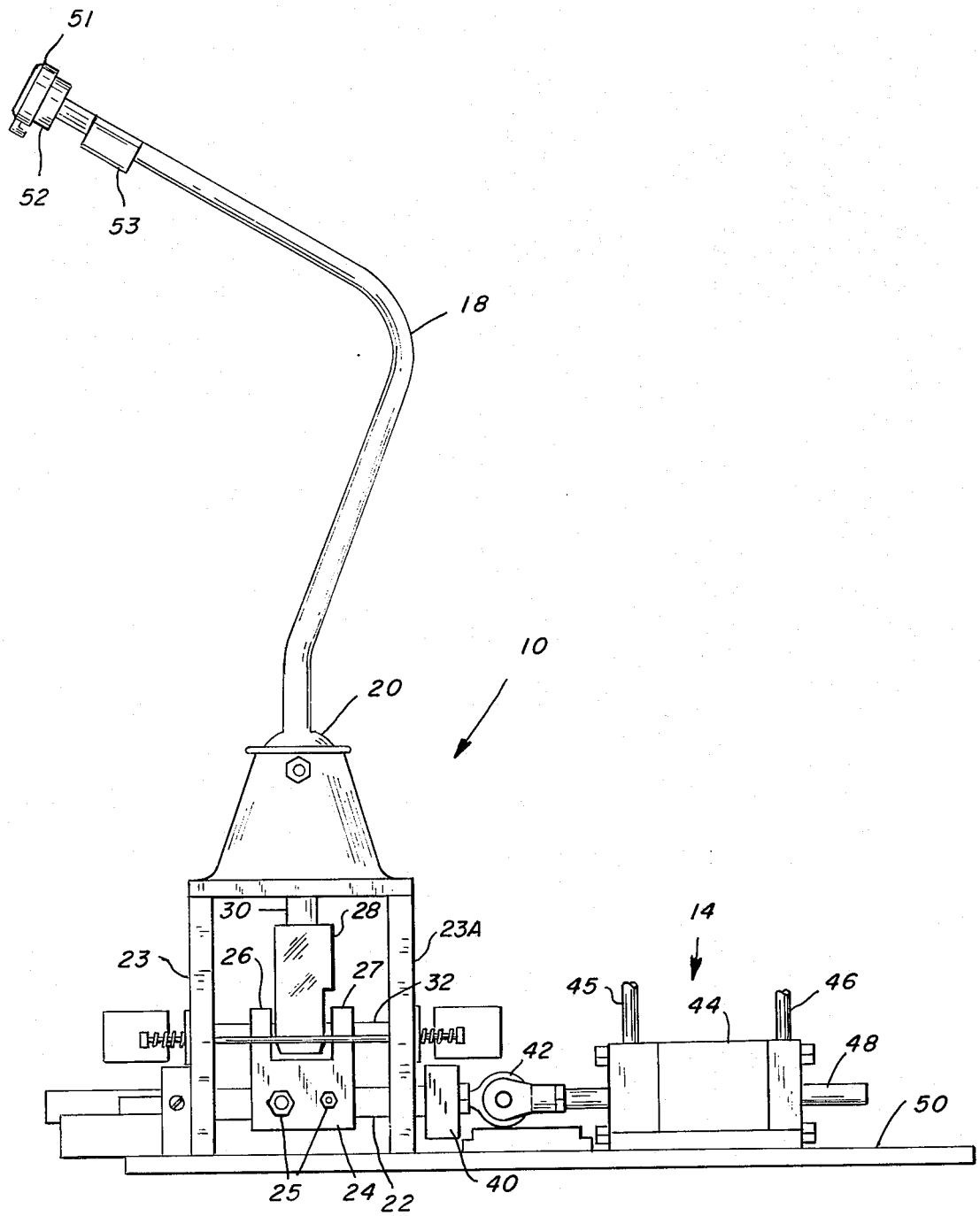
FIG. 1 represents a schematic assembly of the overall transmission simulator, load cell, and hydraulic actuator.

Referring now to the drawings and in particular to FIG. 1 there is generally described by the numeral 10 the truck transmission simulator of this invention. The numeral 40 indicates the load cell and numeral 14 indicates generally the hydraulic actuator mechanism. These are all mounted on a base 50. The transmission 10 comprises a frame having upright walls 23 and 23A, a ball and socket joint 20 which controls the movement of a shift lever 18 having a handle 51 and a second and third gear shifting devices 52 and 53.

Figure 3:
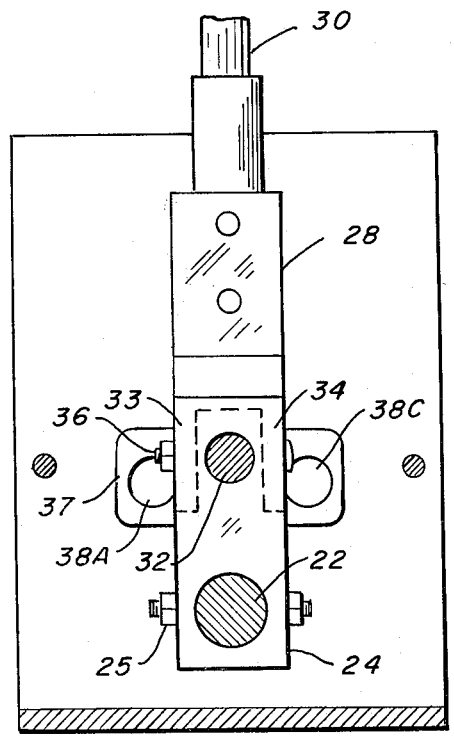
FIG. 3 is a cross sectional view of FIG. 2 taken along the line 3—3 of FIG. 2.

The lower end 30 of the shift lever carries a block 28 which has, as shown in FIG. 3, a forked end with tines 33 and 34. There is a first shaft 22 which is journaled in two bearings in the uprights 23, 23A which is adapted to permit the shaft 22 to traverse longitudinally and to rotate. There is a block or arm 24 fastened to the first shaft by means of bolts 25 which carries an actuator rod 32 which is parallel to the first shaft 22. The forked block 28 fits over the actuator rod 32 and is adapted thereby to rotate the block about the shaft 22. The block 28 also fits between two upright portions 26 and 27 of the arm 24 so that the shift lever can move the block longitudinally. This double motion simulates the operation of a conventional gear shift lever.

Shown in FIG. 1 is the load cell 40 which is clamped between the first shaft 22 and the shaft 48 of a hydraulic actuator 44, which has two fluid connections 45 and 46. There is a swivel device 42 tying these two together, since first shaft 22 must rotate and the shaft 48 does not rotate.

Figure 2:
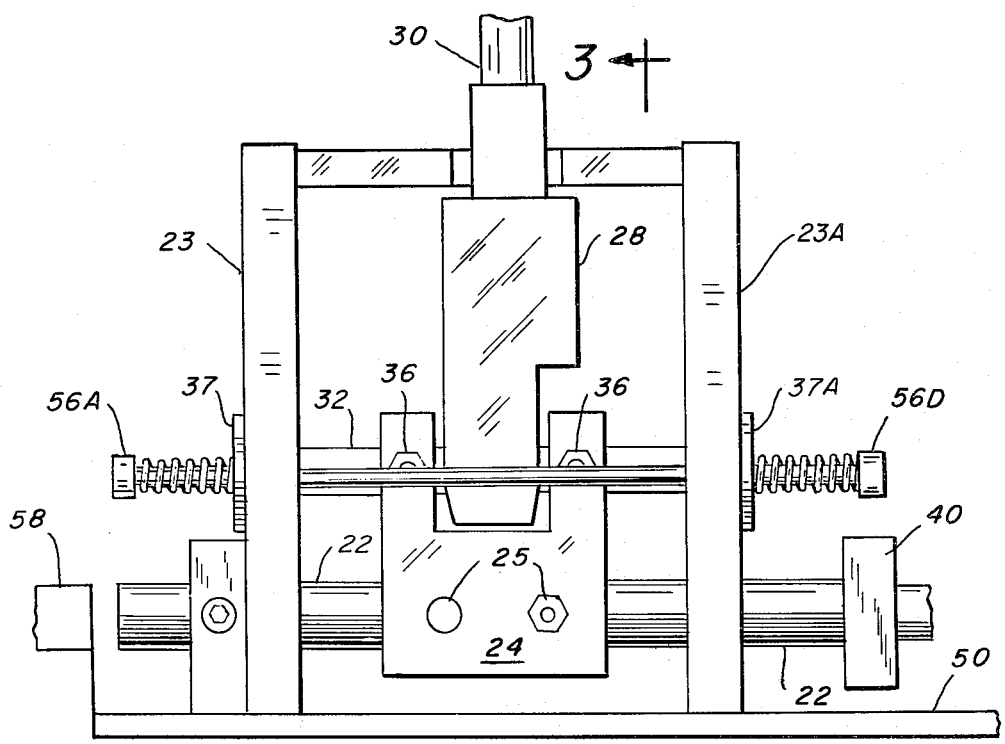
FIG. 2 is an enlarged view of the transmission gear selector and contact switches.

FIG. 2 shows, to a somewhat larger scale, the portion 10 of FIG. 1 and in particular shows two of a plurality of short plungers 56A and 56D which operate switches (not shown). When the actuator rod 32 is traversed far enough it will close a switch corresponding to the particular opening into which it is inserted. There are two sets of switches, one set operates when the actuator rod is partially inserted into a selected opening and a second set which operates when the actuator rod is fully inserted, FIG. 3 shows a cross section of FIG. 2 taken along the line 3—3 of FIG. 2, and indicates a plate 37 with a plurality of circular openings compatible with shift pattern for any given transmission 38A, 38C, etc. through which the actuator rod can be inserted to close the appropriate switches connected to the plungers 56A and 56B, etc.

Thus, between the FIGS. 1, 2, and 3 it will be clear that the actuator rod 32, when properly positioned in rotation about the shaft 22, and enabled by the hydraulic actuator 44, can insert the actuator rod 32 into one or the other of a plurality of openings in plate 37 and 37A attached to both of the upright walls 23 and 23A. The insertion of the rod 32 completely into one of the openings indicates the complete meshing of the gears corresponding to a particular ratio.

The switches corresponding to the plungers 56A and 56D are actuated at the beginning of the insertion of the rod 32 into one of the openings. There is also a pair of switches 58A, 58B, on the rod 22 which is actuated only when the rod 32 is fully inserted into one or the other of the openings. The first switches 56A and 56B, for example, are actuated at the beginning of meshing as an indication of which gear ratio it is intended to operate the transmission, and the corresponding switch 58 on the first shaft indicates when any one of the gear ratios is completely meshed.

Figure 4:
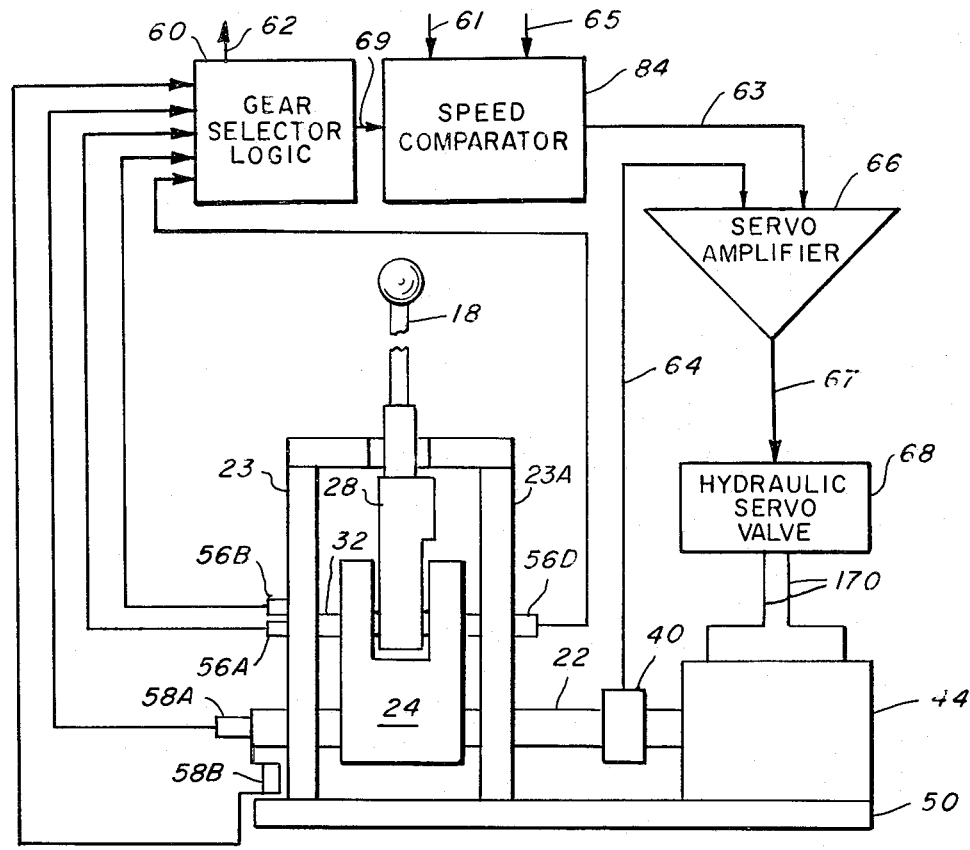
FIG. 4 is a schematic electro-mechanical-hydraulic circuit of the transmission simulator.

Refer now to FIG. 4, there is shown in schematic form the mechanical portions of the transmission somewhat similar to FIGS. 1 and 2 and indicating the initial entry switches 56A, 56B, . . . 56D and the complete entry switches 58A and 58B. All of these switches are connected by appropriate leads to a box 60 identified as gear selection logic. This is provided to produce suitable analog signals which go by way of lead 62 to the analog simulation apparatus to be described in connection with FIG. 5. There is also an output lead 69 which is an analog signal bearing information regarding the particular gear ratio selected but not actuated. This goes to a speed comparator unit 84 which has two inputs 61 and 65, these respectively carry analog voltages corresponding to the engine speed and the transmission speed, which corresponds to the ground speed, and which will be described in connection with FIG. 5.

The two signals on 61 and 65 are combined with a signal on 69, corresponding to the selected gear ratio which modifies these two to be in correspondence. If after modification these two signals correspond within a selected small percentage of being equal, an appropriate signal is passed on lead 63 to a servo amplifier 66. There is another input to the servo amplifier coming by way of lead 64 from the load cell 40. The operation of the servo amplifier is such that when the output signal on lead 63 is at the proper logic level, indicating substantial agreement between the engine speed and the ground speed corrected for gear ratio, the servoamplifier is then enabled to follow the indication of the load cell through lead 64, and to send a corresponding signal via lead 67 to the hydraulic servo valve 68. This sends over conduits 170, appropriate fluid pressure at one or the other inlet to the hydraulic actuator 44, so as to correspondingly move the first shaft 22 and to permit entry of the actuator rod 32 into the proper gear selector opening.

On the other hand, when the speed comparator 84 has an output on its leads 63 which indicates improper matching of the two speeds, then the servo amplifier 66 prevents entry of the actuator rod 32 into the opening. What it does is to reverse the polarity of the signal provided by the load cell, so that as the shift lever 18 is pushed in one direction, an opposite force is generated by the hydraulic actuator 44 to prevent entry, thus, the student operator handling the shift lever 18 gets the feeling that when the speeds are not matched it is impossible to mesh the gears, and therefore he must adjust the speed ratio in order to obtain a condition that will permit meshing of the gears.

Figure 5:
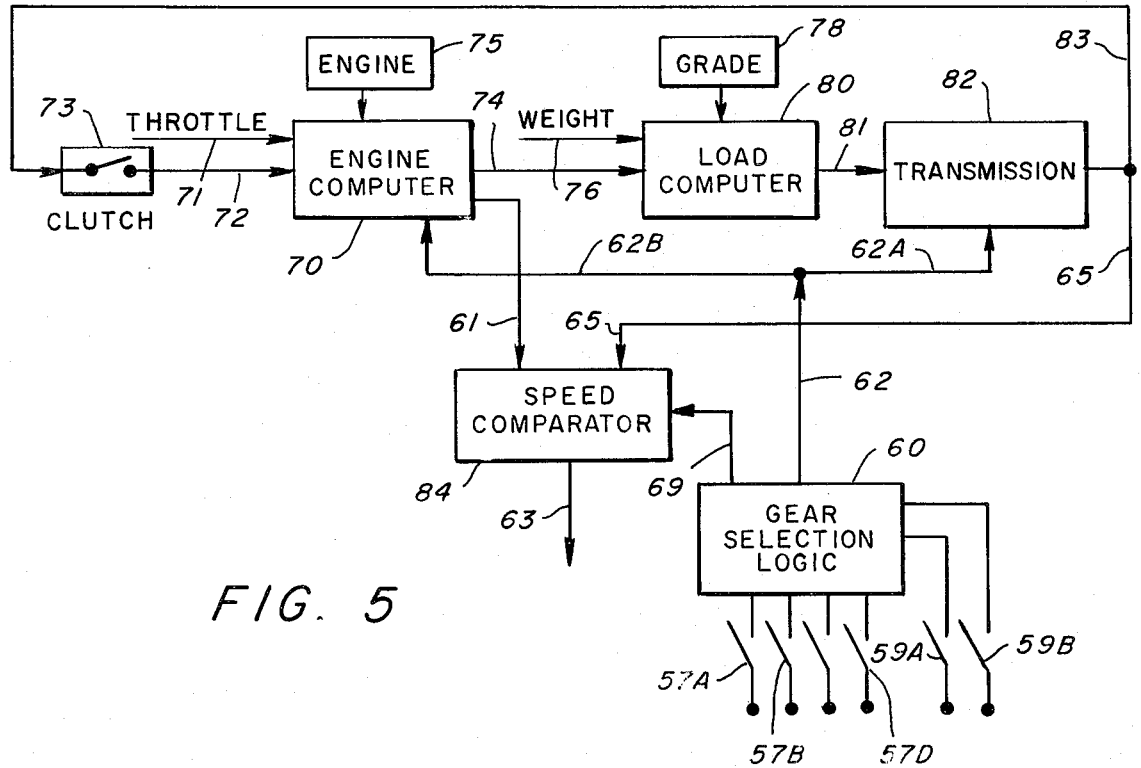
FIG. 5 is a schematic circuit of the logic elements which provide the two speed indicators of engine speed and ground speed for the system of FIG. 4.

Referring to FIG. 5 there is shown in schematic form an analog logic simulation apparatus for generating analog signals corresponding to the engine speed and the transmission speed, which represents ground speed. An engine computor 70 which has four inputs, one corresponding to 75 which is the load-speed characteristic of the engine, and 71 a throttle input which represents the position of the throttle. Both of these are analog d.c. signals which are combined in accordance with predetermined characteristics. There is also an input on 72 from the clutch 73, and an input on line 62B from the gear selection logic 60. The output on line 74 is a d.c. voltage representative of the engine speed.

The engine speed signal on line 74 goes to a load computer 80 where the signal is modified in accordance with the weight indication input on lead 76, and the grade input on 78, both of which effect the actual speed of the engine dependent upon the overall mass, or weight, of the truck load system, and of the grade of the road. This modified output goes by way of lead 81 to a transmission simulator 82, the output of which is fed back by lead 83 through a switch 73, which corresponds to a clutch, as feedback for the engine computer. This goes by way of lead 72.

The output signal on line 65 from the transmission 82 and the output signal on line 61 from the engine computer are both analog d.c. voltage representative respectively of the transmission and engine speeds. These go to the speed comparator 84. The gear selection logic unit 60 corresponds to the same box as in FIG. 4.

The various switches 57A, 57B . . . 57D corresponding to the switch boxes 56A, 56B . . . 56D, and the switches 59A and 59B corresponding to the switch boxes 58A and 58B, all of which represent the instantaneous condition of the transmission, go into gear selection logic box 60. There is an output from the gear selection logic box 60 which goes by way of lead 69 to the speed comparator so that there can be a proper comparison between engine speed and ground speed, dependent upon the actual gear ratio. Also, there is a lead 62 which goes both to the engine computer 70 and the transmission 82 which indicates to the logic in those two boxes whenever the transmission is out of gear and, therefore, there is no connection between the engine and the transmission.

Reviewing the elements and operation of this invention, the principal part of the invention is an apparatus for teaching drivers how to operate the clutch, throttle and transmission on a truck, so as to maintain the proper speed inside of the gear box between the engine shaft and the clutch, and the drive shaft and the jack shaft. This knowledge is important to the operation of the truck since the gear box is designed normally so that the gears between the drive shaft and the jack shaft cannot be meshed unless they are rotating at substantially the same speed. There is available to the driver student a speedometer indicating ground speed and a tachometer representing engine speed. The student is instructed that in going from a lower to a higher gear, when he is at full speed in the lower gear, he must drop the speed of the engine from 2100 r.p.m., for example, down to a selected speed, such as 1700 r.p.m., and to control the clutch so that the jack shaft will be operating at that corresponding speed so that he will be able to mesh the drive shaft and the jack shaft, which will then be going in correspondingly equal speeds.

When he has the proper speeds on the jack shaft and drive shaft, then the speed comparator 84 having three inputs corresponding to engine speed and transmission speed and gear selection indication, will put out a control signal on lead 63 to the servo amplifier, telling it to control the hydraulic actuator to permit entry of the actuator rod into the appropriate opening, and thereby to close the appropriate switch 58A or 58B indicating that the gears are meshed.

If the double clutching and similar operations required by the driver to control the speed of the jack shaft in correspondence with the speed of the drive shaft are not properly made, then the output of the speed comparator 84 will indicate to the servo amplifier 66 that the gears should not be meshed and therefore the hydraulic actuator 44 in response to the signal from the load cell 40 will operate to prevent entry of the actuator rod 32 into the proper opening. This will be indication to the driver student that he must re-examine the speed conditions, make the appropriate change on the jack shaft speed by clutching again and changing the speed to the proper one, opening the clutch, and then again trying to mesh the gears and repeating this as necessary until the proper speed conditions have been reached.

In FIG. 5 the simulated computers 70 for the engine, 80 for the load, and 82 for the transmission are analog systems which have d.c. analog signals as inputs and modify these signals by amplification or deamplification, and in other ways, so as to provide indications on the output leads 61 and 74, corresponding respectively to the engine speed dependent upon the throttle control 71 and the engine characteristic 75, and the actual ground speed as indicated by the transmission modified by the load input 76, and the grade input 78.

In actual practice a truck drive system includes, in addition to a selected number of fixed gear pairs, additional two speed transmissions, which might be operated by the controls 52, 53, shown schematically in FIG. 1. Since the principal problem of the transmission simulation lies in the multi-speed gear box, the description has been centered on that apparatus, although in operation the driver student will also use the simulated overdrives.

Also involved in the apparatus of this invention is a visual display which can be a strip film or slide projector with selected indicia provided to control various inputs to the analog logic apparatus. For example, when a slide showing an increase in grade is presented to the driver, the indicia will provide for appropriate input to the load computer. Also, when a curved road is shown, the steering wheel must be turned to correspond.

There are also audio and vibratory signals presented to the student corresponding to the actual conditions in a truck. Thus, when the student is trying to mesh gears, and actuator is opposing the shift lever, appropriate noises of clashing gears will be provided.

Also, a vibratory impulse can be provided to the driver's seat corresponding to the speed of the engine as set by the throttle lever, and so on.

While the various logic boxes have been described as analog systems, it will be clear that they can also be designed as equivalent digital systems as is well known in the art. Also, while one of the important applications of this system is in the training of truck drivers or operators, the same system can be used to simulate any vehicle having a manual transmission.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a training apparatus for use in training operators of vehicles having manual transmissions, the improved simulator of a gear shift mechanism comprising;
    a. a frame;
    b. a first shaft adapted to rotate and to slide in two axially aligned bearings in said frame;
    c. a second shaft clamped to and parallel to said first shaft;
    d. at least one plate attached to said frame with at least two openings, into which said second shaft can be sequentially inserted by rotating and axially traversing said first shaft;
    e. force indicating means indicative of the axial force acting on said first shaft;
    f. actuator means acting coaxially on said force indicator and said first shaft; and
    g. servo means responsive to said force indicating means for axially traversing said first shaft.

2. The operator training apparatus as in claim 1 including simulation means for producing an indication of the speed difference between the engine speed and the ground speed, said servo means responsive also to said speed difference indication.

3. The operator training apparatus as in claim 2 including gear shift lever means to rotate and traverse said first shaft.

4. The operator training apparatus as in claim 3 including in said servo means, when said speed difference indication is less than a selected amount, means to cause said actuator means to assist said gear shift lever to traverse said first shaft.

5. The operator training apparatus as in claim 3 including in said servo means, when said speed difference indication is greater than a selected amount, means to cause said actuator means to oppose said gear shift lever to traverse said first shaft.

6. The operator training apparatus as in claim 1 including first switch means associated with each opening indicative of the partial penetration of said second shaft into one of said openings.

7. The operator training apparatus as in claim 6 including second switch means responsive to the complete traverse of said first shaft, indicative of full penetration of said second shaft into one opening.

8. The operator training apparatus as in claim 1 including a second plate in operating relation respectively to the opposite end of said second shaft from said at least one plate, said second plate having at least one opening.

9. The operator training apparatus as in claim 2 in which said simulation means comprises:
   a. first means for producing a first analog electrical signal which is a function of engine speed;
   b. electromechanical gear shift means indicative of the past and selected gear ratio indicated respectively by a full entry switch on the opening in said at least one plate into which said second shaft had previously been inserted, and a partial entry switch on a second opening in said at least one plate into which said second shaft is to be inserted.
   c. second means responsive to said gear shift means and to the indications of past and selected gear ratios for producing a second analog electrical signal which is a function of ground speed; and
   d. third means for producing a third analog electrical signal which is a function of a comparison between said first and second analog electrical signals.

10. In a operator training apparatus for use in training operators of vehicles having manual transmissions the improvement in means to indicate a function of the difference between engine speed and ground speed comprising:
   a. first means for producing a first analog electrical signal which is a function of engine speed;
   b. electromechanical gear shift means indicative of the past and selected gear ratios indicated respectively by a full entry switch on the opening in said at least one plate into which said second shaft had previously been inserted, and a partial entry switch on a second opening in said at least one plate into which said second shaft is to be inserted;
   c. second means responsive to said gear shift means and to the indications of past and selected gear ratios for producing a second analog electrical signal which is a function of ground speed;
   d. third means for producing a third analog electrical signal which is a function of a comparison between said first and second analog electrical signals; and
   e. fourth means responsive to said third electrical signal for preventing entry of said gear shift means into said selected gear ratio.

11. The training apparatus as in claim 10 in which said first means comprises means to generate a component signal as a function of the position of a throttle lever, and means to modify said component signal in accordance with the engine load-speed characteristic.

12. The training apparatus as in claim 11 in which said gear shift means includes a plurality of first switches indicative of specific gear lever positions and second switch means indicative of the condition when the gears are fully meshed.

13. The training apparatus as in claim 10 including means to modify said first analog electrical signal in accordance with the mass loading of said simulated vehicle, and the grade of the road over which the vehicle is assumed to be traveling.

* * * * *